Figure 1:
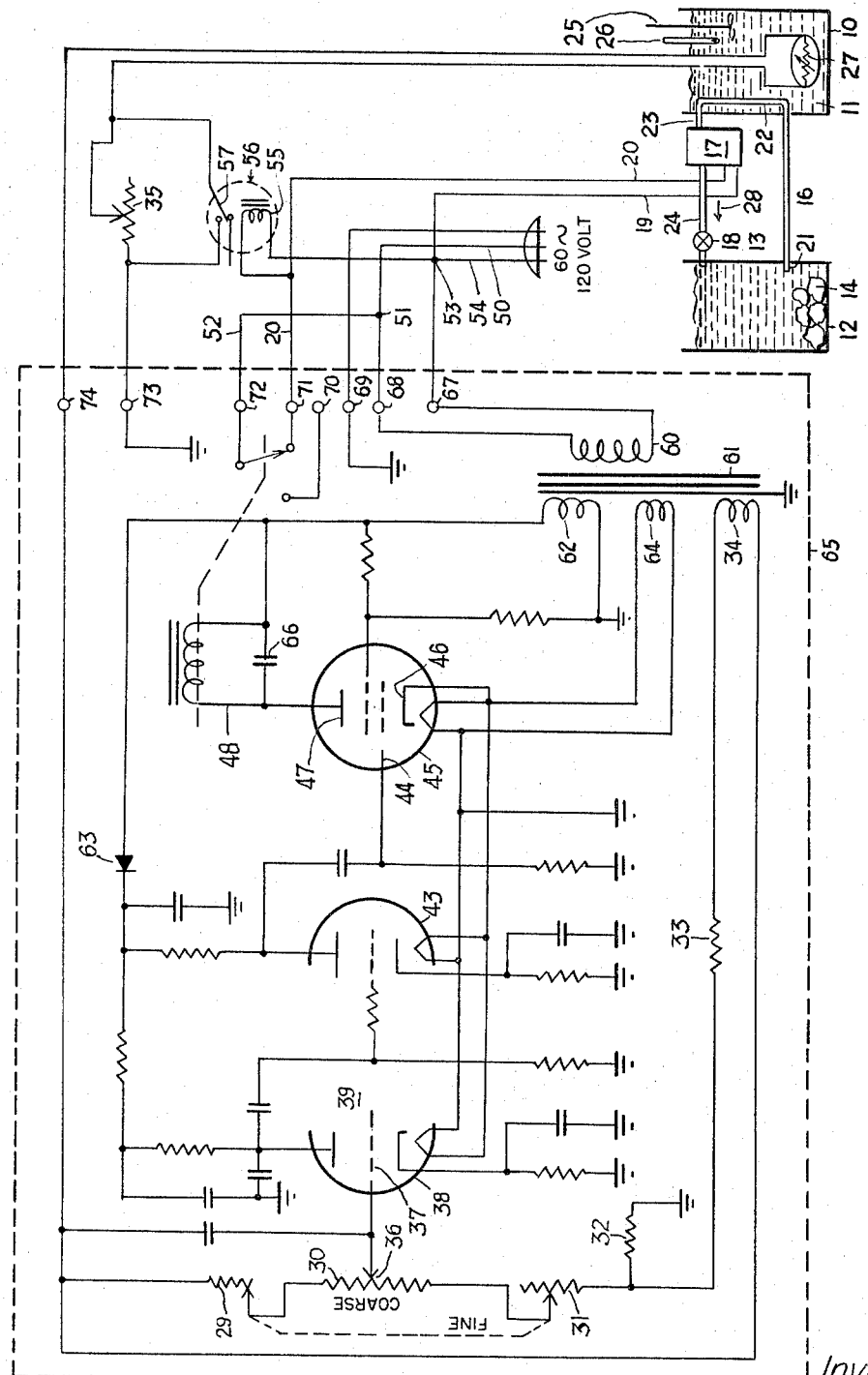

May 7, 1968  R. E. MANNING ETAL  3,381,490
CONSTANT TEMPERATURE SYSTEM
Filed Dec. 20, 1966  2 Sheets-Sheet 2

Inventors
Robert E. Manning
Wallis A. Lloyd
By A. H. Caser
Attorney

3,381,490
CONSTANT TEMPERATURE SYSTEM

Robert E. Manning and Wallis A. Lloyd, Boalsburg, Pa., assignors to Cannon Instrument Company, Boalsburg, Pa., a corporation of Pennsylvania
Filed Dec. 20, 1966, Ser. No. 603,378
8 Claims. (Cl. 62—201)

This invention relates to an improved temperature-controlling system for use in controlling temperature, within narrow limits, of such temperature-controlled devices as liquid baths, solid members like blocks of metal, gas-filled vessels, environmental chambers, and the like. It is applicable to control the temperature of devices operated below, at or near, or above ambient temperatures.

A principal object of the invention is to provide a temperature control system which is precise but simplified and inexpensive by comparison with conventional installations of comparable precision. The system is also capable of being added on to existing installations. Other objects and advantages will be apparent from the ensuing description.

Generally speaking, the system comprises the device whose temperature is to be controlled, a temperature sensor in thermal contact with the device and able to detect temperature changes therein, and a temperature controller responsive to the sensor and operable to effect cooling or heating of the device as required. More particularly, the temperature controller relates to electrical circuits, responsive to the sensor, and operative to control a temperature-changing means, the latter acting to change the temperature of the said device either by removing or adding heat. The system further comprises, as will be set forth in detail, means for reducing temperature fluctuations which normally characterize a temperature control operation.

In one installation heretofore used to control temperature, over which the invention represents an improvement, the sensor is an electrical resistance whose value changes with temperature, and the controller comprises an adjustable resistance bridge employing the sensor as one leg, an amplifying circuit whose input signal is derived from the bridge and whose output signal controls switch means, such as a relay, and said relay. The latter regulates the operation of temperature-changing means, resulting in the application of heating or cooling to the temperature-controlled device. The operation of this installation may be described briefly in connection with a device operated below ambient temperature. When the temperature of the device increases slightly above the set or control temperature, the resistance of the sensor decreases slightly, the bridge in turn becomes slightly unbalanced and this creates a small electrical signal which is amplified by the amplifying circuit, the amplified signal operates the relay, and the latter actuates a coolant flow apparatus to secure coolant to flow to the temperature-controlled device and cool it. During such cooling, the resistance of the sensor increases, and when the bridge is balanced again, the amplified signal decreases to a point such that the relay returns to its original position, thus halting coolant flow. The device is then free to absorb heat again from its surroundings, and the described procedure is repeated.

In such installation, the relay, after returning to its original position, does not again operate until a finite temperature increase, for example 0.1 degree F., has occurred in the device. After the device again becomes so warm as to initiate cooling, the cooling continues until the temperature has been lowered a finite amount, such as 0.1 degree F. This finite temperature increment or fluctation, termed the "dead zone," may vary from 10 degrees F. in an installation of low cost but poor precision to 0.01 degree F. in a precise but costly installation. A dead zone of 0.1 degree F. is typical of an average cost average precision installation. In the installation described in the preceding paragraph, a dead zone increment of 0.1 degree F. may be represented by an equivalent small resistance change in the sensor.

While applicable to installations in which the flow of either a heating or cooling medium is controlled, the invention may be portrayed in detail in connection with the flow of a cooling medium, and particularly in relation to an installation of the type referred to in the preceding paragraph. Thus, according to the invention, means are provided for reducing the described temperature fluctuation to a value in the range of $\frac{1}{10}$ to $\frac{1}{2}$ of the typical value, namely, to 0.01 to 0.05 degree F., and specifically by employing, instead of one continuing step of cooling as described in the last paragraph, a series of cooling steps of short duration, thus approaching the control temperature by many short applications of coolant and consequently reducing the risk of over-cooling. Such applications of short rapid cooling are brought about by operating the switch means, comprising said relay, described above, a plurality of times, instead of just once, in the action of cooling the device, and the means for accomplishing this result comprise a resistance which can be adjusted and which can be intermittently placed in circuit with the sensor resistance to provide a total resistance different than either, thereby to unbalance the bridge, and a second switch means, such as a second relay, for intermittently changing the total resistance, and therefore the condition of bridge unbalance, by cutting in or out of circuit the second or adjustable resistance. The operation of these elements, in conjunction with the sensor, bridge, amplifying circuit, and relay already mentioned, will presently appear in more detail.

Figure 2:
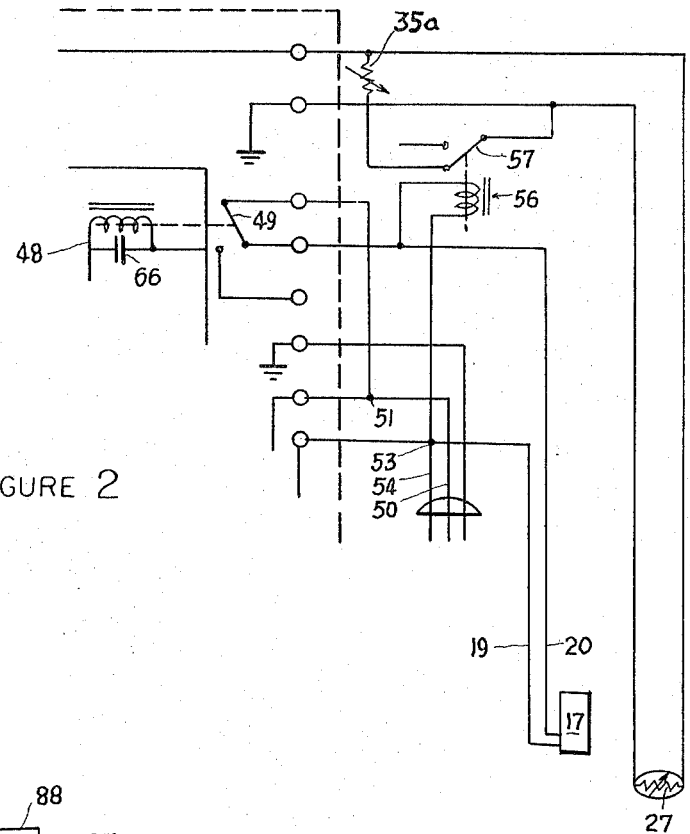
Figure 3:
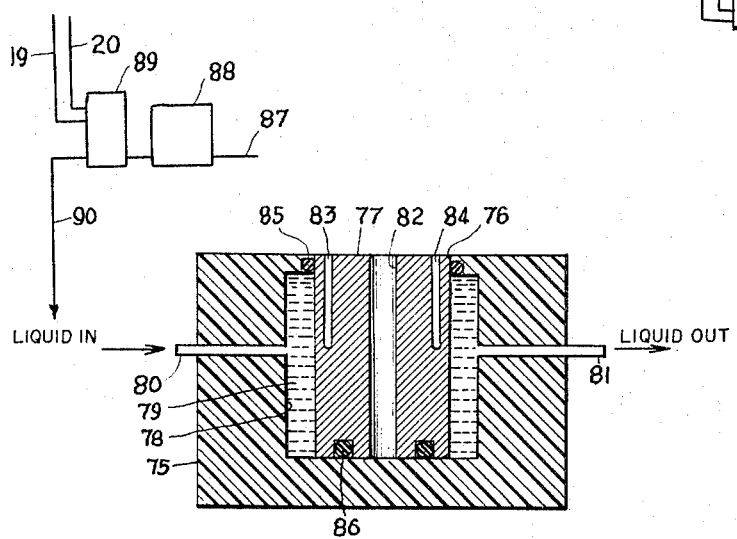

The invention may be better understood by referring to the accompanying drawings, which are diagrammatic and in which FIG. 1 is a view of a constant temperature device together with an electrical switching system;

FIG. 2 is a view of part of the switching system of FIG. 1 but showing a modification; and FIG. 3 is a cross-sectional view of another temperature-controlled device.

Referring to FIG. 1, that portion of it comprising the constant temperature device, together with coolant, coolant storage and flow means, including valves, is described in detail, and also claimed in Patent 3,267,687, issued Aug. 23, 1966. A brief description of the same will be given, however, as being helpful to the understanding of the invention. The device comprises a bath container 10, usually provided with a lid not shown, which is nearly filled with bath liquid 11 comprising the liquid which is to be cooled and maintained at constant temperature. On one side of the container is a reservoir 12 comprising a tank for holding coolant 13, this preferably being a solution of solid carbon dioxide, of which blocks 14 are shown, in a solvent such as methanol or acetone. Between the container 10 and reservoir 12 means are provided for flowing coolant to container 10, in indirect heat exchange with the liquid 11, in response to a signal or call from a temperature sensor in the bath liquid; and means are also provided for closing off the flow of coolant in response to a call. Such flow and flow closing means comprise a conduit member or coolant flow tube 16, an electric solenoid control valve represented by the box 17, and a hand throttle valve 18. A pair of leads 19, 20 extend into box 17 and connect to the solenoid coil therein; the other ends are connected to an electrical switching system to be described. The coolant flow tube 16 extends horizontally into reservoir 12 a short distance where its inlet end 21 is disposed well below the level of coolant 13; and opposite such end the tube extends horizontally into the container 10, where it turns and extends vertically, as at 22, then turns again to a horizontal disposition at 23 and enters box 17, and finally extends again at 24 to hand throttle valve 18 and thence into reservoir 12. A motor operated stirrer is shown at 25, a thermometer at 26, and a temperature sensor in the form of a probe at 27, comprising a glass-enclosed variable resistance which, as will be described, functions as one leg of a resistance bridge.

The operation of the bath 10, in respect of the flow of coolant thereto from reservoir 12 through the conduits and valves, may be described briefly as follows.

Coolant 13 in reservoir 12 will flow into tube 16, the valves 17 and 18 being open for this purpose, and will fill tube 22. The bath liquid 11, for example methanol, transfers heat to the cold solution in tube 22 causing carbon dioxide gas to boil out of solution, and this gas will push or entrain some methanol through section 23 of the tube in the direction of arrow 28, the mixture passing forcefully through the open valves 17 and 18 and into reservoir 12. Because of the pressure differential created, additional saturated solution from the reservoir enters inlet 21 of the tube. Thus, if valves 17 and 18 remain open, circulation is continuous and the bath liquid will cool.

When the bath cools to a desired control temperature, the probe 27 operates through the switching system, described below, to close the solenoid valve 17. Carbon dioxide continues to boil out of the liquid in tube 22 but now the pressure in this tube above the liquid builds up rapidly, forcing the liquid back through inlet 21 into the reservoir. Hence, cooling ceases, and the bath begins to warm up by heat transfer from the surroundings. By virtue of the rapid action of the cooling cessation step, undercooling (sometimes designated overcooling) is avoided and fine control of the bath temperature is possible. It will be noted that cessation of cooling is self-regulated, i.e., a self-ceasing cooling action is involved.

When the temperature moves slightly above the control point, probe 27 again signals valve 17 to open, the pressure in tube 22 is reduced, cold solution again fills tube 22, and cooling commences again. In this manner the bath can be held to within slight variations above and below a desired control temperature.

Throttle valve 18 can be adjusted such that the rate of cooling more nearly approximates the rate of heat gain from the suroundings. This tends to reduce the degree of cycling of the temperature. The motor-operated stirrer 25 tends to establish a uniform temperature throughout the bath. Carbon dioxide gas is vented from the reservoir by means not shown.

The bath liquid 11 is one that is liquid and stable at the chosen temperature, and may include wax-free hydrocarbons, acetone, methanol, etc. If desired, the bath liquid may be the same as the carbon dioxide solvent, which may be any of those set forth in said Patent 3,267,687. Similarly, other coolants may be used as described therein.

The electric circuits which are energized by the probe 27, note FIG. 1, and which control the operation of the solenoid 17, may now be described. Generally, and as indicated, these circuits are controlled by the probe, whose resistance changes with temperature, and include an adjustable resistance bridge circuit which at control temperature is at or near the null or balance condition and of which the probe 27 forms one leg; an amplifying circuit whose input signal comes from the bridge circuit and whose output signal controls a switching means, preferably a relay 48, which provides full on or full off operation and which in turn controls the flow of current through the solenoid 17; an adjustable or second resistance 35 inserted between the sensor and the bridge/amplifying circuits; a second switch means, preferably a relay 56, both the resistance 35 and the relay 56 being under the control of the relay 48. If the bridge and amplifying circuits are designated temperature controller circuits, the second relay-controlled resistance can be described as inserted between the temperature sensor and the temperature controller circuits. Also, if the bridge is operated with alternating current, the input signal to the bridge must be properly phased with the power source to the bridge to insure proper detection of the signal for heating or cooling, depending on the state of the bath.

The adjustable resistance bridge circuit includes the variable resistance or probe 27, adjustable resistances 29, 30, and 31, fixed resistances 32 and 33, coil 34 which supplies AC power to the bridge, and the adjustable or second resistance 35. Element 35 is in the bridge circuit by virtue of being connected in series with variable resistance 27 and to ground. It will be noted that signals from the bridge circuit, which are drawn off at point 36 of resistance 30, and which enter grid 37 of triode 38, also have a path to ground.

It will be understood that the condition of the bridge is in balance, or at null point, when the bath liquid 11 is at control temperature; when the bath temperature is too high, the bridge becomes unbalanced in one direction, and when the bath temperature is too low, the bridge becomes unbalanced in the other direction.

The functions of the remaining electrical elements in FIG. 1 will become apparent from the following consideration of the operation of the system.

Consider that the temperature of bath liquid 11 becomes higher than the control temperature. In turn, this decreases the resistance of probe 27 and unbalances the bridge in one direction, producing an AC signal at point 36. This signal passes to grid 37 of triode 38, where it is amplified, and the output is further amplified by the triode 43. The resulting signal is presented to grid 44 of beam power amplifier 45, but the voltage of the signal is out of phase with the voltage between cathode 46 and plate 47 and therefore no signal current is passed by the tube. No current flows to the relay 48, and the arm or armature 49 remains in the righthand position shown.

However, AC line current flows through the coil of solenoid 17, as is apparent from the circuit 50–17–54 comprising line 50, point 51, line 52, arm 49, line 20, solenoid 17, line 19, point 53, and line 54. The solenoid valve 17, which is normally closed when not energized, is therefore open, permitting cold solution to pass from reservoir 12 through pipes 16, 22, 23, and 24 and thus cool the bath liquid 11.

At the same time, circuit 50–55–54 is energized, comprising line 50, point 51, line 52, arm 49, line 20, coil 55 of relay 56, and line 54. The effect of energization of relay 56 is to draw arm 57 down to the position shown, placing adjustable resistance 35 in the bridge circuit. It will be seen that resistance 35 is thus added in series with the increasing resistance of probe 27; the effect of this addition is to provide a total resistance in the probe leg which unbalances the bridge in the other direction. In this case, a signal is produced at point 36 which, after amplification by triodes 38 and 43 and presentation to grid 44 of tube 45, is passed by such tube because the voltages are in phase. Consequently, current flows through tube 45. The amplified signal is sufficient to activate relay 48, which then draws arm 49 to the left, thus opening the circuit 50–17–54. No current flows through solenoid 17 and therefore the valve closes, shutting off the flow of coolant, and permitting bath liquid 11 to warm up.

With the opening of circuit 50–17–54, the circuit 50–55–54 also opens, permitting arm 57 to close, thus cutting out the resistance 35. At this point, the temperature of bath liquid 11 is such that the resistance of probe 27 is insufficient to bring the bridge to a condition of balance, and therefore the bridge is unbalanced in the said first direction. Once again a signal appears at point 36, is amplified by triodes 38 and 43, but will not pass through tube 45 because the voltages are out of phase; relay 48 is de-energized, arm 49 moves to the right, energizing circuit 50–17–54, the solenoid 17 is energized, and the solenoid valve opens to let coolant flow through pipe 22, cooling the bath; relay 56 is energized, arm 57 moves down to cut resistance 35 back into circuit in series with the probe, and the bridge thus becomes unbalanced in the said other direction. The foregoing procedure is repeated a plurality of times, and the bath is cooled each time for a period of short duration.

When the bath is at control temperature, the bridge is balanced. However, this situation obtains only momentarily, as the relay 48 becomes de-energized and permits arm 49 to move to the right and cut in the solenoid 17, etc. Thus, for most of the time the bridge is in a condition of unbalance, and it may be seen that the described temperature fluctuation or dead zone is substantially restricted.

Now consider the situation where the bath liquid is at control temperature and then cools below such temperature. The resistance of probe 27 increases as a result, and this unbalances the bridge in the said other direction. A signal appears at point 36 which is amplified by triodes 38 and 43 and tetrode 45 and which activates relay 48. Arm 49 moves left, opening circuit 50–17–54 so that no current flows through solenoid 17. Consequently the solenoid valve is closed and the bath liquid warms. Circuit 50–55–54 is inactivated, cutting out resistance 35. However, the probe resistance is still increased above normal, and as a result the bath continues to warm up. This continues until control temperature is attained. With the bridge balanced, it is then ready for the next temperature change.

Summarizing briefly, it will be seen that when the bath is too warm, it is cooled intermittently by means of a rapid sequence of short cooling steps until it attains a balance between the continuous abstraction of heat from the surroundings and the intermittent flow of coolant. The relative length of the cooling and heating steps depends on the degree of unbalance of the bridge; i.e., the steps are of shorter duration when the bridge is only slightly unbalanced, and of longer duration when the unbalance is greater. It may be noted that with the bath being operated at below ambient temperature, the main problem is to keep it cool. It will also be seen that the rapid application of cooling steps of short duration is brought about by the intermittent and rapid addition of a resistance in series with the probe resistance. The decreased resistance of the probe, when added to this additional resistance, gives a total resistance which unbalances the bridge in the said other direction, producing a signal which is in phase with the bridge power source and with the voltage across tube 45, and this is amplified and passed to the relay 48, energizing it, resulting in cessation of coolant flow. Not only is such flow stopped, but the circuit containing the second relay 56 is inactivated, thereby cutting out the added resistance and leaving only the probe resistance to unbalance the bridge. The action then repeats, each cooling step reducing the temperature of the device by a small amount until it is at control temperature.

When the bath is too cool, the resistance of probe 27 is greater than that required for balancing the bridge, and no coolant flows. The bath is warmed by abstraction of heat from the surroundings.

It will be apparent that primary coil 60 of transformer 61 is energized by line current. Secondary coil 62 applies a potential to the plates of the triodes, being first rectified by diode 63 to DC voltage. Secondary coil 64 feeds the tube heaters. All of the tubes, the transformer, relay 48, and most of the bridge circuit are enclosed as a unit, as designated by the dashed line outline 65.

The contacts at 67 and 74 comprise a terminal strip, which is a convenient means of connecting together the probe, power supply, solenoid valve, relay 56, and armature 49 of relay 48.

In FIG. 2 a modification is shown in which an adjustable resistance 35a is added in parallel with the probe rather than in series. Resistance 35a has a value which is preferably much larger than that of the probe. Only a portion of the system of FIG. 1 is shown, but enough, it is thought, to illustrate the action of resistance 35a. It will be understood that the only difference between FIGS. 1 and 2 is that in the former the resistance 35 is in series with the probe while in the latter it is in parallel. The total resistance of elements 27 and 35a, in parallel, is less than the value of 27 alone.

Considering the operation of FIG. 2, when the bath liquid is too warm, the probe resistance decreases, and the bridge becomes unbalanced in one direction, a signal appears but is not passed by tube 45 owing to a difference in phases, no current flows in relay 48, and the solenoid 17 is activated by line current to open, allowing coolant to flow, and the bath cools. At the same time, relay 56 is activated by line current to draw arm 57 down to the position shown, thus cutting resistance 35a out of circuit. As the bath cools, the resistance of the probe increases to an extent such as to unbalance the bridge in the opposite direction, thereby allowing current to flow through tube 45 to activate relay 48; arm 49 swings to the left, inactivating the solenoid, which closes, thus permitting the bath to warm up, and relay 56 is also inactivated to permit arm 57 to move up and thus cut into circuit the resistance 35a. The latter is placed in parallel with the probe. The total resistance of 35a and 27 becomes less than that of the probe, and therefore the bridge becomes unbalanced in the said one direction, so that the foregoing action repeats.

When the bath liquid becomes too cold so as to require warming, the probe resistance increases, the bridge becomes unbalanced in the said other direction, a signal appears which is passed to relay 48 and which activates it, thus moving arm 49 to the left and opening the circuit to the solenoid. The latter acts to close the solenoid valve, shutting off coolant flow and allowing the bath to warm up. At the same time, the circuit containing relay 56 is opened, this relay becomes inactivated, and arm 57 moves up to cut into the circuit the resistance 35a. The total resistance of 35a and 27 becomes less than that of 27, and therefore the bridge becomes unbalanced in the said one direction. This results in inactivating relay 48 and permits line current to flow through the solenoid, opening the valve and letting the bath cool; line current also flows through relay 56, drawing down arm 57 and thus cutting out the resistance 35a. Cooling of the bath allows the probe resistance to increase, so as to unbalance the bridge in the said other direction. The action repeats, as set forth above.

As will be apparent, the cooling or warming actions effected by the arrangement of FIG. 2 occur as a series of steps.

The temperature controlled device of FIG. 1 is sometimes termed a "bath," or a "constant temperature bath," or a "constant temperature environmental device." As indicated, the invention is applicable to other systems besides a bath. For example, if container 11 held air instead of liquid, it then could constitute an environment chamber suitable for maintaining sensitive substances like tissue specimens, bacterial cultures, etc. at a closely controlled low temperature. Frozen foods may similarly be maintained at a constant low temperature. Additionally, the size of the device may be increased as desired, even to that of a walk-in chamber. In these applications, the lid is replaced by a non-apertured air-tight panel or wall. Or the container 11, having any suitable type of fluid therein, may be used for other purposes, including application in a freeze drying system and the like.

Still another temperature-controlled device for which the invention is applicable is shown in FIG. 3, comprising a block 75 of plastic such as nylon which is recessed at 76 to receive a block 77 of metal the temperature of which is to be closely controlled. Between the blocks another recess 78 is provided for holding heat exchange medium 79 which enters at 80 and leaves at 81. Block 77 is recessed at 82 to receive a test liquid. At 83 and 84 are wells for a temperature sensor and thermometer, respectively. O-rings 85 and 86 serve to prevent leakage. Heat exchange medium, for example methanol, whose temperature has been suitable adjusted by means not shown, may be taken from a storage source, not shown, by line 87 and pump 88 and passed through a solenoid valve 89 operated in the manner set forth for the valve 17 in FIGS 1 or 2. As shown, leads 19 and 20 are connected to the solenoid 89 and function as described. The medium is delivered by line 90 to the inlet 80. Medium leaving the recess 78 is passed by line 81 back to the said storage source. It will be understood that the medium in the storage source may be cooled or heated to a desired temperature by suitable means.

The invention may be illustrated by the following example.

Example

A constant temperature bath was set up, together with a reservoir of coolant, solenoid valve, and associated piping, as shown in FIG. 1. The arrangement is described in detail in Patent 3,267,687. The bath contained about 0.9 gal. of methanol, and the reservoir about 0.9 gal. of a solution of carbon dioxide in methanol. Blocks of solid carbon dioxide were also present in the reservoir. Control temperature was 2 degrees F. The electrical switching system was as shown in FIG. 1, using 12AX7 as tube 39 and 6AQ5 as tube 45. The probe was a bead-thermistor, comprising a glass-enclosed thermistor about $\frac{1}{16}$ inch in diameter having a resistance of about 4770 ohms at 2 degrees F. It was connected to an alternating current bridge and amplifier with relay output, as shown. Temperature in the bath liquid was measured by means of an ASTM thermometer 72F having a scale reading from $-2.5$ to $+2.5$ degrees F. in divisions of 0.1 degree and an ice point scale. Readings could be estimated accurately to $\pm 0.01$ degree. A number of runs were made in which a resistance (note 35 of FIG. 1) of varying value was placed in series with the probe. The following data were observed:

| Run No: | Resistance in series with probe, ohms | Maximum range of temperature fluctuation observed, °F |
| --- | --- | --- |
| 1 | *0 | 0.44 |
| 2 | 20 | .25 |
| 3 | 30 | .10 |
| 4 | 40 | .05 |
| 5 | 50 | .04 |
| 6 | 60 | .03 |
| 7 | 100 | .06 |

* The observed data at 0 ohm were taken without use of the relay 56 or resistance 35.

It will be seen that the last four runs represent a 10-fold improvement over run No. 1 where no resistance in series was employed. For a given system constructed according to the invention, the preferred resistance to be placed in series with the probe can be determined for each system; also the cyclic frequency response of the relay (note 48 in FIG. 1) may be adjusted by varying the capacitance of capacitor 66; thus an increased capacitance results in a decreased frequency of cyclic response, and vice versa.

Other temperature sensing elements may be substituted for the thermistor 27, such as a resistance thermometer, or any other device whose resistance changes continuously with changing temperature, and with appropriate circuitry.

In place of the relay 48, other switching means may be employed, such as a silicon-controlled rectifier or other device which provides a full on or a full off switching action. It is also feasible to employ one relay instead of the two shown, provided of course that it is equipped to mechanically operate both armatures 49 and 57.

It will be understood that the invention is capable of obvious variations without departing from its scope.

In the light of the foregoing description, the following is claimed:

1. In a constant temperature system comprising a temperature-controlled device, a temperature sensor positioned for thermal contact therewith, and a temperature controller responsive to the sensor and operable to effect a change in temperature of the device to maintain the same at a control temperature, wherein said sensor comprises an electrical resistance whose value changes with temperature, said controller comprising an adjustable resistance bridge of which the sensor is one leg and which produces a signal upon being unbalanced by a change in sensor resistance, wheerin switch means are presently controlled by an output signal from said bridge and adapted to provide full on or full off switching, and wherein temperature-changing means are present controlled by the switch means for changing the temperature of said device, the improvement comprising a second resistance adapted to be intermittently placed in circuit with the sensor resistance to provide a total resistance different than either, thereby to unbalance the bridge, a second switch means controlled by the first switch means for intermittently changing said total resistance, and therefore the condition of bridge unbalance, by cutting in or out of circuit said second resistance, said temperature-changing means being energizable to effect a change in temperature of said device, said second switch means being energizable to change said total resistance and also the condition of bridge unbalance, thereby to de-energize said temperature-changing means and to effect a change in temperature of said device opposite to said first change, said first and second switch means being thus intermittently operative on said temperature-changing means to intermittently change the temperature of said device in one direction and the opposite direction.

2. Constant temperature system of claim 1 wherein said second resistance is adapted to be placed in series with the sensor resistance.

3. Constant temperature system of claim 1 wherein said second resistance is adapted to be placed in parallel with the sensor resistance.

4. Constant temperature system of claim 1 wherein said first and second switch means comprise relays.

5. Constant temperature system of claim 1 wherein said temperature-changing means comprises an electric valve.

6. In a constant temperature system comprising a temperature-controlled device, a temperature sensor positioned for thermal contact therewith, and a temperature controller responsive to the sensor and operable to effect a change in temperature of the device to maintain the same at a control temperature, wherein said sensor comprises an electrical resistance whose value changes with temperature, said controller comprises an adjustable resistance bridge of which the sensor is one leg and which produces a signal upon being unbalanced by a change in sensor resistance, wherein switch means are present controlled by an output signal from said bridge and adapted to provide full on or full off switching, and wherein electric valve means are present controlled by the switch means for allowing heat transfer medium to flow to said device, the improvement comprising a second resistance adapted to be intermittently placed in circuit in series with the sensor resistance to provide a total resistance greater than the sensor, thereby to unbalance the bridge and to produce a signal effective to activate said switch means, a second switch means controlled by the first switch means for intermittently cutting in or out of circuit said second resistance, said electric valve means and second switch means being in circuits energized by line current, said electric valve means being energizable by line current to open to permit flow of medium and said second switch means being thereby made effective to cut in said second resistance in series with the sensor resistance, said bridge thereby becoming unbalanced to produce a signal which activates said first switch means to open the valve-containing and second switch means-containing circuits, thereby resulting in shutting off flow of medium and inactivating said second switch means, and inactivation of the second switch means serving to cut out said second resistance so that the bridge signal does not activate said first switch means, thereby allowing said valve to become energized again to permit flow of medium.

7. Constant temperature system of claim 6 wherein said heat transfer medium is a coolant.

8. In a constant temperature system comprising a temperature-controlled device, a temperature sensor positioned for thermal contact therewith, and a temperature controller responsive to the sensor and operable to effect a change in temperature of the device to maintain the same at a control temperature, wherein said sensor comprises an electrical resistance whose value changes with temperature, said controller comprises an adjustable resistance bridge of which the sensor is one leg and which produces a signal upon being unbalanced by a change in sensor resistance, wherein switch means are present controlled by an output signal from said bridge and adapted to provide full on or full off switching, and wherein temperature-changing means are present for changing the temperature of said device, the improvement comprising an additional resistance adapted to be placed intermittently in circuit with the sensor resistance to provide a total resistance different than the sensor resistance, thereby to unbalance the bridge in a direction opposite that produced by a change in sensor resistance alone, a second switch means controlled by the first switch means for intermittently changing said total resistance, and therefore the condition of bridge unbalance, by cutting in or out of circuit said additional resistance, said temperature-changing means being responsive to said first switch means to effect a change in temperature of said device and said second switch means being thereby made effective to change said total resistance, thereby to unbalance said bridge in said opposite direction and to inactivate said temperature-changing means.

References Cited
UNITED STATES PATENTS

| | | | |
|---|---|---|---|
| 3,049,887 | 8/1962 | Sharp | 62—126 |
| 3,151,468 | 10/1964 | Martin | 62—126 XR |
| 3,227,207 | 1/1966 | Litman | 62—126 XR |

MEYER PERLIN, *Primary Examiner.*